Aug. 12, 1958     R. K. TIEDEMAN ET AL     2,847,102
ELECTRICALLY ACTUATED CLUTCH
Filed Dec. 5, 1955
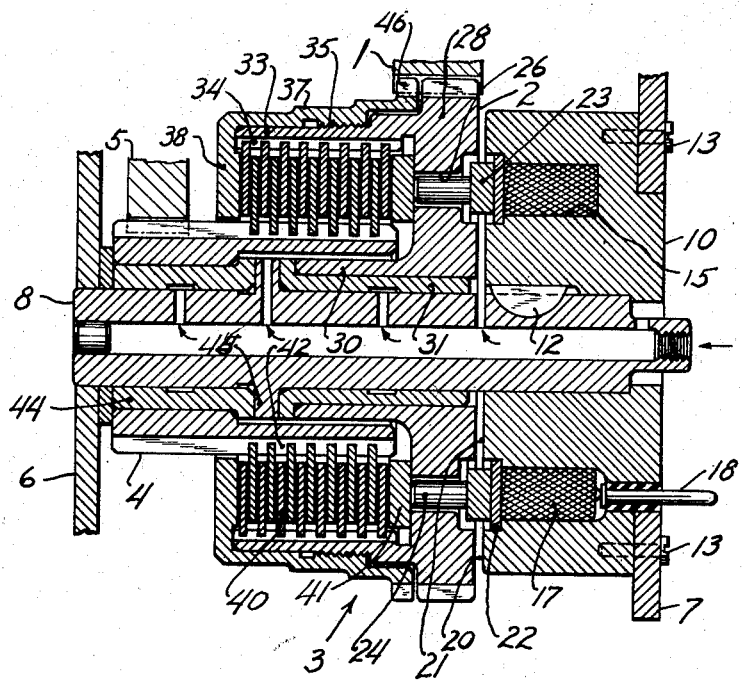
INVENTORS
ROBERT K. TIEDEMAN
JOSEPH M. MERGEN
BY
*Godfrey B. Spein*
ATTORNEY

2,847,102
ELECTRICALLY ACTUATED CLUTCH

Robert K. Tiedeman, Packanack Lake, and Joseph M. Mergen, Verona, N. J., assignors to Curtiss-Wright Corporation, a corporation of Delaware Application December 5, 1955, Serial No. 550,955

6 Claims. (Cl. 192—84)

This invention concerns electrically actuated friction clutches or couplings, and relates particularly to the type of clutch wherein a solenoid is energized to create the force required to press clutch plates together for mechanical driving relation therebetween.

Objects of the invention are:

To provide a clutch assembly including a driving and a driven member having inter-engageable clutch plates drivably related to each member, and a solenoid disposed adjacent the members which is energizable to force the plates into driving engagement;

To provide a solenoid-actuated clutch wherein the magnetic flux path is as short as possible and includes parts of the clutch structure;

To provide an assembly and clearance adjusting mechanism in a clutch structure which is self-locking when the clutch is in its operating environment;

To provide a self-contained clutch unit, movable along its own axis by the magnetic attraction of an adjacent solenoid, wherein the reaction to magnetic attraction for clutch closure is also assumed by the solenoid;

To provide a solenoid-actuated clutch unit which is simple in design and easily fabricated, and which is light in weight for its power-transmitting capacity.

The details of the invention may be understood from the following description read in connection with the drawing wherein the single drawing figure is a longitudinal section through a preferred embodiment of the invention.

The clutch of the invention has general utility in any of a number of different environments, but is particularly useful in the pitch changing mechanisms of aeronautical propellers and aeronautical accessories and auxiliary selective drives. Such environments usually comprise a driving gear operated by a prime mover, and a driven gear driving the desired load. In the figure, the driving gear is shown at 1, engaging the input gear 2 of the clutch assembly 3. The assembly has an output gear 4 engaged with a load gear 5. The assembly 3 is mounted in a structure including fixed plates or supports 6 and 7. This mounting consists of a pilot shaft 8 secured in plate 6 upon which some of the clutch parts are carried. The securement for the right end of the shaft 8 comprises an annular solenoid core 10 of magnetizable material in a bore of which the shaft is keyed as at 12. The core 10 is screwed to the plate 7 as at 13.

The annular core 10 contains an annular slot 15 within which is disposed a coil 17, leads from the coil being connected to insulated connector pins as shown at 18. The coil 17 is preferably pre-wound and inserted in the core slot, after which it is firmly secured in place by potting material, which when cured, bonds the coil mass firmly to the core. The left face of the coil as shown is recessed relative to end faces 20 and 21 of the core, the latter comprising two annular pole-pieces. The end of the recessed core is covered by a non-magnetic washer 22 of bronze or like material.

A bearing ring 23 rests on the washer 22 and is rotatable relative thereto. The ring has a plurality of pins 24 extending from its leftward face, the pins passing through holes 26 formed in the solid web 28 of input gear 2. The gear web 28, of magnetizable material, forms an armature for the solenoid 10, 17 and is attracted toward the pole pieces 20 and 21 when the coil 17 is electrically energized. The core 10 and web 28 together provide a massive but compact and efficient flux path.

The gear web 28 carries an integral hub 30 carried on a bushing 31 journalled on the pilot shaft 8. The web 28 also carries an integral cylindrical sleeve or skirt 33 near its rim. The skirt is internally splined as at 34, and carries external screw threads 35. A cap 37 fits over sleeve 33, and is secured thereto by internal threads thereon engaged with threads 35. The left end of the cap 37 includes an inwardly extending flange 38. Within the annular cavity defined by the sleeve 33, the gear web 28 and the flange 38 is contained a stack of friction clutch plates 40. The flange 38 and a thrust ring 41 are disposed for engaging the left and right ends of the clutch stack respectively. Alternate plates of the stack are externally splined to engage sleeve splines 34. The other plates are internally splined and engage a rightward prolongation 42 of the output gear 4. This gear is mounted on a bushing 44 journalled on the pilot shaft 8. Axial location and separation of elements 30 and 4 is assured by a flange 45 on the pilot shaft. The pilot shaft 8 is hollow to comprise a lubricant conduit and drillings through the shaft, as shown, provide for lubricant flow to the bearings and clutch plates.

The cap 37 is provided, at its rightward end as shown, with a narrow spur gear 46, the same in diameter and pitch as the spur gear 2. By the simultaneous meshing of gears 2 and 46 with the drive gear 1 during normal operation of the system, the cap 37 is prevented from rotation relative to the gear 2. When not engaged with gear 1, gear 46 and its cap 37 and flange 38 may be rotated relative to sleeve 33. Through the screw connection 35, spacing of flange 38 from gear web 28 and thus, the friction plate stack 40, may be axially adjusted. This enables setting up of the plate stack for a desired degree of freedom between driving and driven plates, either on initial assembly or after the plates have become worn through use.

The clutching operation of the assembly as described consists in energizing the coil 17 electrically. Thereupon, pole-pieces 20, 21 draw the armature 28 toward the solenoid, thereby pressing the flange 38 in a rightward direction as shown against the left end of the plate stack 40. The plates are thus pressed together into driving engagement to establish drive from the input gear 2 to the output gear 4. Reaction to the clutching pressure is assumed by thrust ring 41, the pins 24 and ring 23, which bears on the solenoid washer 22. Thus, both action and reaction of the compact clutch assembly are assumed wholly by the close-knit solenoid, minimizing the slack and backlash which would be present in a more complex arrangement. When the system is rotating, the ring 23 rotates relative to the washer 22; these are made for thrust bearing compatability and are lubricated from one of the oil drillings in shaft 8. Normally, the system is adjusted so that the armature 28 has running clearance with the pole-pieces 20 and 21 when the solenoid is energized. As is clear, the solenoid 10, 17 is a non-rotating subassembly, simplifying electrical connections thereto and eliminating the rotating inertia which would be present if it were a rotating mass.

While we have shown and described one embodiment of our invention, it is to be understood that various modifications and changes may be made, and that it may be

We claim:

1. A magnetically actuated coupling comprising a first gear having a web and hub, and having a cylinder extending therefrom, a pilot shaft on which said hub is journalled, a second gear journalled on said pilot shaft having a sleeve extending within said cylinder and defining an annular cavity therewith, a stack of friction plates in said space alternately in driving engagement with said cylinder and sleeve, a cap for said cylinder and plate stack having a portion screw threadedly engaging the exterior of said cylinder to confine said stack, said cap having a gear formed thereon like said first gear and lying adjacent said first gear when the cap is screwed upon said cylinder, both said adjacent gears being meshable with a co-acting gear whereby the cap and cylinder are secured in relatively non-rotative engagement; said first gear having a plurality of openings through the web thereof, pins passing through said openings engageable with the end plate of said stack of friction plates, a ring secured to said pins externally of said first gear, an annular solenoid coaxial with said first gear and secured against rotation, said solenoid including pole-pieces in electro-magnetic relation to said first gear, and said solenoid having a track thereon engaged in relatively rotating relation by said ring upon energization of said solenoid and movement of said first gear toward the solenoid pole-pieces, said plate stack upon such energization being squeezed together between said ring and pins, and said first gear, cylinder and cap, to effect a driving coupling between said first and second gears through the plates of said stack.

2. A magnetically actuated coupling comprising a non-rotating solenoid having concentric annular pole-pieces, an annular rotatable armature attractable by said solenoid when energized, said armature having a plurality of holes therethrough, a ring rotatably engaging the face of said solenoid in thrust bearing relation and having pins thereon passing through said armature openings, an annular member on said armature defining a clutch cavity, a stack of friction clutch plates including a thrust ring at one end within said cavity, said thrust ring being engaged by said pins and the other end of the stack being engaged by said annular member, and a member drivably engaged by some of said plates, others of said plates being drivably engaged with said annular member, said plate stack upon solenoid energization being squeezed together between said pins and said annular member to provide a driving engagement between the plates.

3. A coupling according to claim 2 wherein said annular member includes a screw-threaded connection with said armature and includes an external spur gear, and wherein said armature includes an adjacent similar spur gear, the teeth of said gears being registerable with one another and being jointly engageable with the teeth of another gear jointly meshed therewith.

4. A magnetically actuated coupling comprising a rotary driving member, a rotatable driven member, one member having internal splines and the other having external splines, a stack of clutch plates between said members, alternate plates engaging the internal splines and the other plates engaging the external splines, a plate retaining cap at one end of the internally splined member, a rotatable armature at the other end of the internally splined member, a rotatable plate pressing member engaging the end of the plate stack adjacent said armature, and a non-rotatable solenoid disposed near said armature energizable to draw the armature toward it, said pressing plate engaging a part of said solenoid in thrust bearing relation to press on said clutch plates upon movement of the armature toward said solenoid.

5. A coupling comprising a gear journalled for rotation, a second gear similar to the first and coaxial therewith, a screw-thread connection between said gears enabling them to be axially adjusted relative to each other upon relative rotation thereof, a third gear engaging both said first two gears jointly to hold them against relative rotation and consequently against relative axial movement, said first two gears having members thereon jointly defining an annular internal cavity, clutch plates contained within said cavity, the axial adjustment between said first two gears enabling adjustment of the end clearance of said plates relative to said members, one of said first two gears having openings formed in the web thereof, pins passing through said openings and engaged with an end plate of said clutch plates, and non-rotating electromagnetic means energizable to attract said first gear thereto, said pins including a reaction ring having thrust-bearing engagement with the face of said electromagnetic means, whereby said plates are pressed together between said pins and the member of said second gear forming the other end of said annular cavity.

6. A magnetically actuated coupling comprising a member having a web and a hub and a cylinder extending from said web, a pilot shaft on which said hub is journalled, a second member journalled on said pilot shaft having a sleeve extending within said cylinder and defining an annular cavity therewith, a stack of friction plates in said space alternately in driving engagement with said cylinder and sleeve, a cap for said cylinder and plate stack, said cap being secured to said cylinder to confine said stack; said first member having a plurality of openings through the web thereof, pins passing through said openings engageable with the end plate of said stack of friction plates, a ring secured to said pins externally of said member, an annular solenoid coaxial with said member and secured against rotation, said solenoid including pole-pieces in electromagnetic relation to the web of said first member, and said soleoid having a thrust bearing track thereon engaged in relatively rotatable relation with said ring upon energization of said solenoid and movement of the member web toward the solenoid pole pieces, said plate stack upon such energization being squeezed together between said ring and pins, and said first member, cylinder and cap, to effect driving coupling between said first and second members through the plates of said stack.

References Cited in the file of this patent

UNITED STATES PATENTS

| Re. 19,150 | Furnas | May 1, 1934 |
| 1,543,993 | Elkington | June 30, 1925 |
| 2,209,776 | Kiekhaefer | July 30, 1940 |
| 2,592,695 | Hindmarch | Apr. 15, 1952 |

FOREIGN PATENTS

| 1,043,520 | France | June 10, 1953 |